United States Patent
Roth et al.

(10) Patent No.: US 9,321,174 B2
(45) Date of Patent: Apr. 26, 2016

(54) MANIPULATOR ARRANGEMENT AND METHOD FOR OPERATING THE MANIPULATOR ARRANGEMENT

(71) Applicant: KUKA Roboter GmbH, Augsburg (DE)

(72) Inventors: Stefan Roth, Eisenbrechtshofen (DE); Michael Ruf, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 203 days.

(21) Appl. No.: 13/690,454

(22) Filed: Nov. 30, 2012

(65) Prior Publication Data

US 2013/0144436 A1 Jun. 6, 2013

(30) Foreign Application Priority Data

Dec. 2, 2011 (DE) .......................... 10 2011 120 037

(51) Int. Cl.
 B25J 9/18 (2006.01)
 H02P 3/14 (2006.01)
 B25J 9/16 (2006.01)
 B25J 19/00 (2006.01)

(52) U.S. Cl.
 CPC ... B25J 9/16 (2013.01); B25J 19/00 (2013.01)

(58) Field of Classification Search
 CPC ......... B25J 9/18; H02P 3/14; H02K 2201/18; H02K 49/046; H02K 49/065; H02K 49/10
 USPC .............. 318/568.11, 568.17, 568.18, 568.2, 318/568.21, 375–378
 See application file for complete search history.

(56) References Cited

U.S. PATENT DOCUMENTS

| 4,602,195 | A | * | 7/1986 | Eberle et al. ............. 318/568.11 |
| 5,444,348 | A | * | 8/1995 | Garrec ......................... 318/640 |
| 5,936,375 | A | * | 8/1999 | Enoki ........................... 318/727 |
| 7,703,562 | B2 | * | 4/2010 | Kalik ............................. 180/8.1 |
| 2006/0190136 | A1 | * | 8/2006 | Boyer ......................... 700/245 |
| 2009/0105877 | A1 | | 4/2009 | Hellstrom et al. | |
| 2009/0230898 | A1 | * | 9/2009 | Matsubara et al. ........... 318/376 |

FOREIGN PATENT DOCUMENTS

| CN | 101567572 A | 10/2009 |
| CN | 101628413 A | 1/2010 |
| CN | 101678866 A | 3/2010 |
| DE | 102008019294 A1 | 10/2009 |
| DE | 102009054818 A1 | 6/2011 |
| EP | 0 124 738 A2 | 11/1984 |
| EP | 0914911 A2 | 5/1999 |
| WO | 2011042049 A1 | 4/2011 |

OTHER PUBLICATIONS

German Patent Office; Search Report in German Patent Application No. 10 2011 120 037.5 dated Jul. 3, 2013; 8 pages.
European Patent Office; Search Report in European Patent Application No. 12007859.7 dated Mar. 25, 2013; 5 pages.
Chinese Patent Office; Search Report in Chinese Patent Application No. 2012105064689 dated Aug. 9, 2014; 2 pages.
Chinese Patent Office ; Examination Report in Chinese Patent Application No. 20121056468.9 dated Aug. 20, 2014; 14 pages.
Chinese Patent Office; Office Action in Chinese Patent Application No. 201210506468.9 dated Jun. 18, 2015; 17 pages.

* cited by examiner

*Primary Examiner* — Bentsu Ro
(74) *Attorney, Agent, or Firm* — Wood, Herron & Evans, LLP

(57) ABSTRACT

A manipulator configuration according to the invention comprises at least one manipulator and at least one control device and features a mechanical energy storage device, which is configured for storing mechanical energy of at least one manipulator.

14 Claims, 2 Drawing Sheets

MANIPULATOR ARRANGEMENT AND METHOD FOR OPERATING THE MANIPULATOR ARRANGEMENT

TECHNICAL FIELD

The present invention relates to a manipulator configuration having one or more manipulators, in particular industrial robots, and at least one control device, as well as a method for operating a manipulator configuration of this type.

BACKGROUND

Manipulators, in particular robots in industrial applications, are frequently used in a highly alternating mode. In order to execute the same tasks repeatedly successively as quickly as possible, the manipulator typically drives to a programmed track point at the maximal possible acceleration and brakes promptly before said track point with the maximal possible deceleration in order to accommodate the prescribed velocity, in particular in order to stop at said point. Subsequently, the next track point is again approached at the maximal possible acceleration, and so on. Examples of this are welding, painting and commissioning tasks, which are automatically processed by industrial robots.

During the acceleration phases, the manipulators accumulate kinetic energy. During the deceleration phases, said kinetic energy is converted to electrical energy by the drives of the manipulators and subsequently dissipated as heat via brake choppers in ballast resistors, such that the intermediate circuit voltage does not exceed the maximal permissible voltages of the manipulators. Depending on the application, this loss of energy also applies to the converted potential energy.

This loss of energy to the environment, in particular through the heat dissipated in the brake resistors, is contingent on a high degree of energy input during the operation of the manipulator(s) and represents a substantial impairment to the efficiency of current manipulator configurations.

A typical measure for reducing the energy requirements is the counterbalancing of industrial robots, as is, in particular, proposed in EP 0 914 911 B1. A counterbalancing of this type causes a reduction in the differences in the potential energies at different robot poses, such that preferably in the base axis of the robot, weaker drives and brakes are needed in order to consume less energy for the same movements.

An electrical energy storage device is known from DE 10 2009 054 818 A1, by means of which an intermediate circuit power can be stored. This energy storage device is created using a capacitor. A substantial disadvantage of a storage device of this type is the limited storage capacity, which only represents a fraction of the energy that is consumed by a robot for each movement.

An electrical energy recovery of excess energy from an intermediate circuit to an energy network is known from DE 10 2008 019 294 A1. Disadvantages of this method consist, in particular, of the additional costs for the transformation equipment for converting direct current to alternating current, and the additional energy losses resulting thereby, in particular in the rectifiers and in the commutation inductances.

SUMMARY

The objective of the present invention is to improve the efficiency of a manipulator configuration.

A manipulator configuration according to the invention features one or more manipulators, in particular industrial robots, of which, preferably, one or more, in particular all, can be equipped with, in particular, four, six or seven degrees of freedom, wherein one degree of freedom, in particular, is implemented by means of an axis of the manipulator. Preferably, each axis features a drive, which preferably includes a transmission and at least one electric motor, in particular a synchronous motor or an asynchronous motor, which preferably can also be operated in a generator mode. Moreover, the manipulator configuration according to the invention contains one or more control devices wherein a control device is preferably configured to control one or more manipulators, in particular, all manipulators in the manipulator configuration.

According to the invention, the manipulator configuration features a mechanical energy storage device in order to mechanically store energy from one or more, in particular all, manipulators in the manipulator configuration, in particular, to store said energy temporarily.

By means of the storing of mechanical energy in a mechanical energy storage device, energy from one or more manipulators, in particular during deceleration, can be stored and preferably made available for later use. One such use is preferably an operation of one or more manipulators of a manipulator configuration, in particular a controlling and/or moving, in particular acceleration and/or braking, of one or more manipulators. In addition, or alternatively, said energy may be used for components of one or more manipulators, in particular for the operation of a tool. In addition, or alternatively, said energy may be used for other, in particular, electrical items, which are preferably located in the vicinity of the manipulator configuration, in particular a robot cell, a computer, an acceleration mechanism, a display device and/or a heat exchange apparatus. As a result, greater efficiency is obtained with respect to the energy consumption of the manipulator configuration.

According to a preferred embodiment, the mechanical energy storage device is coupled to an electric motor in order to convert electrical and mechanical energy. An electric motor as set forth in the present invention can, in particular, features one or more electric motors for the conversion of electrical energy to mechanical energy, and/or one or more generators for converting mechanical energy to electrical energy. In addition, or alternatively, an electric motor may be configured to selectively convert electrical energy to mechanical energy in a motorized mode, and to convert mechanical energy to electrical energy in a generator mode.

The manipulator configuration is preferably configured such that electrical energy generated by the manipulator drives, in particular during braking and/or braked lowering, may be used to supply power to the electric motor(s) of the mechanical energy storage device in part or in full, or supplied thereto, converted to the type of energy that is to be stored, and thus stored.

Preferably, the manipulator configuration and/or the energy storage device are additionally or alternatively configured for converting energy from the mechanical energy storage device into electrical energy, and to use this as energy, in particular for acceleration and/or lifting.

Said energy is preferably made available for one or more manipulators, in particular for the operation of one or more manipulator drives of one or more manipulators. Advantageously, a bidirectional energy exchange between the mechanical energy storage device and one or more manipulator (drives) is possible. Partial or complete storage of the energy from one or more manipulators in a mechanical energy storage device then occurs, and an operation of one or more manipulators then occurs, in part or entirely, by means of the energy contained in the mechanical energy storage device. One advantage of a bidirectional energy exchange is that mechanical energy, which is converted by a manipulator to electrical energy during the deceleration phase, is stored, and said energy may be used to again accelerate said manipulator and/or other manipulators, in particular in a subsequent phase. With a highly alternating operation of the manipulators, the energy exchange advantageously occurs promptly.

According to a preferred embodiment, the mechanical energy storage device features one, two, or more energy storage means, preferably decoupled from one another. In a preferred embodiment, one or more energy storage means can be designed such that electrical energy can be stored for a long period of time, optimized for reducing losses thereto. An energy storage means as set forth by the invention is preferably configured in order to covert electrical energy into mechanical energy during a first phase, in a motorized mode, and to convert mechanical energy into electrical energy during a second phase, in a generator mode. Preferably, the mechanical energy storage device contains numerous energy storage means, which differ in their storage capacities, charging power and/or discharging power. Similarly, two or more identical energy storage means may be provided. A mechanical energy storage device having numerous energy storage means can store electrical energy of one or more manipulators, in particular at least in part, as mechanical energy, and in turn provide electrical energy to, in particular one or more manipulators of the manipulator configuration. Advantageously, a simultaneous bidirectional operation can occur. Advantageously, the efficiency of the mechanical energy storage device can be further increased by means of said simultaneous possible charging and discharging procedure.

In one embodiment, the mechanical energy storage device is configured such that one or more energy storage means of the energy storage device are each dedicated to a specific manipulator, in particular a specific manipulator drive. In addition, or alternatively, one or more energy storage means may be dedicated to different manipulators, in particular manipulator drives. A dedication of this type can be either static or dynamic. A static dedication as set forth by the invention is, in particular, a permanent dedication between one or more energy storage means and one or more manipulators and/or manipulator drives. A static dedication can be, in particular, capacity dependent and/or power dependent, in particular in accordance with a power rating of a manipulator drive and/or an energy storage means. By way of example, one or more powerful drives of a first energy storage means and one or more less powerful drives of a second energy storage means can be permanently dedicated. A dynamic dedication as set forth by the invention can occur, in particular, based on predefined criteria and is, preferably in accordance with predefined events, in particular, periodically defined anew. By way of example, energy storage means can be dynamically dedicated to those manipulators that are currently in operation. Similarly, the same manipulators can have different energy storage means selectively dedicated thereto, depending on how much energy the individual energy storage means have already stored.

Preferably a specific dedication is applicable to only one specific time interval, and is then subsequently replaced by a predefined dedication. The criteria for establishing a dedication can be, in particular, a charged state of the energy storage means and/or an estimated amount of energy that is to be stored or made available. The latter is then applicable, in particular, when the energy storage means exhibit different dimensions and differ, for example, in their energy storage capacities. A dynamic dedication can be, in particular, dependent on capacity and/or power, in particular in accordance with a power rating of a manipulator drive and/or an energy storage means. A dedication is primarily understood to be, in particular, an energy transference between manipulator (drive(s)) and energy storage means, or a connection or coupling for an energy transference of this type.

According to a preferred embodiment, the manipulator configuration features an electrical intermediate circuit, by means of which the mechanical energy storage device, in particular the energy storage means thereof, is electrically connected to at least one manipulator drive. An intermediate circuit as set forth by the invention can be, in particular, an electrical device, in particular a converter, which electrically couples numerous electrical networks to a common current or voltage level. A converter as set forth by the invention can be, in particular, a current converter, which generates a voltage that can be varied in terms of amplitude and frequency from a direct or alternating current (both single phase alternating current as well as three-phase alternating current). A device, normally a three-phase AC motor, is operated with this converted voltage. An electric motor of a mechanical energy storage device preferably features a converter and/or a three-phase AC motor. Moreover, the mechanical energy storage device, in particular the converter and/or the motor, contains components in a preferred embodiment, which are also implemented for the manipulator drives. Advantageously, economies of scale can be used thereby, and a cost-effective manipulator configuration can be obtained.

According to a preferred embodiment, one or more energy storage means of the energy storage device are configured for storing kinetic energy. According to a first aspect of said embodiment, one or more of the energy storage means of the mechanical energy storage device feature one or more movement apparatuses, which can accelerate and decelerate a mass in a linear manner or along a curved, in particular circular, track. Preferably, said apparatuses are also designed as linear motors.

In addition, or alternatively, one or more energy storage means of the mechanical energy storage device may feature one or more rotational movement apparatuses, which can, in particular, accelerate and decelerate a rotating mass, in particular one or more flywheels. Preferably, a flywheel is connected directly, or by means of a drive, to a rotational motor. The kinetic energy of a rotating mass, and therefore the stored or consumed energy $E^{kin}_{ES}$ of one or more energy storage means of the mechanical energy storage device increases linearly in relation to the moment of inertia and quadratically in relation to the angular velocity:

$$E_{ES}^{kin}=\int_{t_1}^{t_2}P_{mech}dt=\int_{t_1}^{t_2}M\cdot\omega dt=\int_{t_1}^{t_2}J\cdot\dot{\omega}\cdot\omega dt=\int_{\omega_1}^{\omega_2}J\cdot\omega d\omega=\frac{1}{2}J(\omega_1^2-\omega_2^2),$$

wherein $P_{mech}$ is the mechanical power, t is time, M is the torque, J is the moment of inertia, and ω is the angular velocity of the rotating mass. Accordingly, it is possible to store kinetic energy by means of correspondingly high rotational rates and/or by means of correspondingly high gyrating masses.

Therefore, in a preferred embodiment one or more energy storage means of the mechanical energy storage device of the manipulator configuration is/are equipped with an electric motor, which exhibits a high rotational rate capacity, preferably at least 1,000, in particular at least 5,000, in particular at least 10,000, in particular at least 20,000, revolutions per minute. Preferably, one or more energy storage means of the energy storage device are operated at a rotational rate ranging, in particular, between a minimum and a maximum rotational rate, which is greater than 1,000, in particular greater than 5,000 and/or less than 20,000, in particular less than 10,000, in particular less than 5,000 revolutions per minute. As the starting rotational rate $\omega_1$ of a rotating mass increases, the final rotational rate $\omega_2$ decreases, according to the equation above, in order to be able to store a specific energy $E^{kin}_{ES}$. In comparison with an alternating manipulator drive, operated without a minimum rotational rate $\omega_1$, one or more energy storage means of the mechanical energy storage device are preferably operated at a significantly increased minimum rotational rate $\omega_1$. Because the power is dependent on the rotational rate, one or more energy storage means of the mechanical energy storage device can provide the entire power required by the manipulator, in particular the manipulator drives, at increased currents. One or more energy storage means of an energy storage device of this type can, as a result, be advantageously equipped with smaller converters and/or motors having lower torque capacities than a mechanical energy storage device operated without a starting rotational rate. Preferably the moment of inertia for the gyrating mass is adjusted to the rotational rate capacity, in particular to the energy capacity of the manipulator, optimized for energy use. In this case, energy use is understood to mean, in particular, the quantity of energy that is returned to the manipulator from the energy storage device.

In addition, or alternatively, to storing kinetic energy, the manipulator configuration can be configured to store potential energy. Preferably, one or more energy storage means of the mechanical energy storage device also feature one or more flexible deformation means and/or lifting devices, actuated by one or more electrical motors of the one or more energy storage means of the mechanical energy storage device, for storing potential energy.

Advantageously, an flexible deformation means and/or lifting device can be operated via a transmission, such that one or more energy storage means of the mechanical energy storage device, in particular the converters and/or motors, can be obtained in a compact structural form. One or more translational and/or rotational movement devices or lifting devices can form an energy storage means as set forth in the present invention, by means of said moved masses and/or flexible deformation means.

According to a preferred embodiment, one or more energy storage means of the mechanical energy storage device are configured to store both kinetic, as well as potential, energy. Preferably, this is obtained via one or more masses, which are each coupled in a flexible manner to one or more static drive shafts. Preferably, a coupling is carried out in a torsionally flexible manner, such that with an acceleration of a mass, kinetic and potential energy are stored.

According to a preferred embodiment, the mechanical energy storage device features one, two or more, in particular, rechargeable, electric, electrochemical and/or electro-physical energy storage means, in particular one or more batteries, preferably secondary batteries, one or more rechargeable batteries, one or more fuel cells, one or more capacitors and/or one or more thermal energy storage devices.

An electrical energy storage means as set forth in the present invention can be configured, in particular, for storing energy in the form of electricity, in particular electrostatic and/or electro-dynamic energy, preferably in a capacitive manner.

An electrochemical energy storage means as set forth in the present invention can be configured, in particular, to store energy by means of a chemical process, in particular by means of an endothermic reaction and/or, in particular, release energy via an exothermic reaction.

An electro-physical energy storage means as set forth in the present invention, can be configured, in particular, to store energy by means of a physical process, in particular in a thermal form, preferably through heating a heat storage means, and/or to release energy, in particular through cooling a heat storage means.

According to a preferred embodiment, one or more energy storage means of the mechanical energy storage device feature a motor or numerous motors. Preferably, manipulators can also form an energy storage means, in particular a mechanical energy storage means.

According to a preferred embodiment, the manipulator configuration features a mechanical energy storage device, equipped with a casing. As set forth by the invention, a casing is understood to be, in particular, a device, which encloses the mechanical energy storage device, in particular one or more of its energy storage means, in each case entirely or in part, and is adjacent to the other components of the manipulator configuration. Preferably the casing is designed to be rigid and consists, in particular, of metal, plastic and/or a composite material, preferably exhibiting a high degree of dielectric strength. This offers, in particular, the advantage that a mass rotating at a higher rotational rate will not represent a hazard to components in the vicinity in the case of a malfunction, when parts of the mechanical energy storage device are thrown off into the surroundings. Preferably, the casing is closed and/or designed as a cage. Moreover, the casing preferably provides protection to the energy storage device against environmental influences, in particular against fluctuations in temperature, liquids, moisture, external forces and/or pressure effects.

According to a preferred embodiment, the manipulator configuration features a mechanical energy storage device, which is subject to an, at least partial, vacuum. Preferably, one or more, in particular all, energy storage means are subject to an, at least partial, vacuum. To reduce losses to friction in the operational state of one or more energy storage means of the mechanical energy storage device, in particular a flywheel, it is useful to generate a (partial) vacuum inside the casing by means of a vacuum pump. In addition, or alternatively, chemically active substances, such as oxygen, for example, can be vacuumed off from the direct vicinity of the mechanical energy storage device. In particular for one or more energy storage means of the mechanical energy storage device having a quickly rotating flywheel, a mechanical excitation of aggressive substances by the flywheel is prevented by the vacuum, which otherwise, due to increased chemical reactivity, could lead to damage of the components of the mechanical energy storage device.

According to a preferred embodiment, the manipulator configuration features one or more energy storage means of the mechanical energy storage device, which feature one or more operational and/or emergency brakes for braking and/or stopping the device. Preferably, said brakes are configured for dissipating kinetic energy generated at the drive by means of, in particular, an electrical motor of an energy storage means. In particular, one or more brakes may be designed as safety brakes. A safety brake, as set forth in the present invention, is a brake, in particular, which is engaged when not in the activated state, or is actively aired, and must be released by this means. The braking torque or braking force is preferably generated by means of pre-loaded springs. The brakes are preferably electromagnetically, hydraulically and/or pneumatically aired. In a preferred embodiment, one or more brakes are designed to be redundant, such that if one braking means fails, at least one other braking means is configured to dissipate kinetic energy and/or prevent a movement of the energy storage device, in particular an energy storage means.

According to a preferred embodiment, the manipulator configuration features a mechanical energy storage device, connected in a detachable manner to the manipulator configuration, and in particular, can be selectively inserted as a component of the manipulator configuration in the manipulator configuration. Preferably, the individual energy storage means are designed to be detachable, and can be treated as individual components. For this, in a preferred embodiment the mechanical energy storage device, in particular its energy storage means, features predetermined mechanical and/or electrical interfaces. In particular, the mechanical energy storage device, in particular its energy storage means, is equipped with one, two, three or four plug-in connections, in particular for the purpose of connecting energy and/or data lines to one another, in particular bus systems, in particular between the mechanical energy storage device and another component of the manipulator configuration.

Preferably, the mechanical energy storage device, in particular its energy storage means, is equipped with one, two or more attachment means, in particular for the purpose of attaching the mechanical energy storage device, in particular individual energy storage means, to other components of the manipulator configuration in a permanent or detachable manner. Preferably, at least one attachment means is designed as a tensioning device.

Advantageously, a manipulator configuration can be readily retrofitted with a mechanical energy storage device, and/or a mechanical energy storage device can readily be retrofitted with one or more energy storage means. Moreover, advantageously, a mechanical energy storage device, in particular its energy storage means, of a manipulator configuration can be implemented by means of predefined interfaces in other manipulator configurations.

In a preferred embodiment, the manipulator configuration features a mechanical energy storage device, designed to be transportable. Preferably, individual, or all, energy storage means of the mechanical energy storage device are designed to be transportable. The mechanical energy storage device, in particular its energy storage means, is preferably designed such that it can be connected in a detachable and/or moveable manner to the surroundings, in particular a manipulator, and/or can be accommodated and/or repositioned by a transportation device, in particular a forklift or a driverless transportation system.

Similarly, the mechanical energy storage device, in particular its energy storage means, can also be designed to be driven and/or carried, featuring, for example, preferably adjustable rollers.

Preferably, the mechanical energy storage device, in particular its energy storage means, has a standardized form. In particular, the mechanical energy storage device and/or its energy storage means is configured to be integrated in a standard control cabinet, in particular a 19" plug-in unit.

In a preferred embodiment, the manipulator configuration is equipped with a mechanical energy storage device, featuring a control device. In particular, the individual energy storage means can also feature a control device. The control device preferably executes the registration of components as well as the control of active components of the energy storage device, in particular a converter, the electric motor, and/or a brake. Preferably, the control device is configured for executing a regulation of the electric motor, preferably the range for the rate of rotation, in particular, preferably for adjusting a rotational rate and/or a voltage. Preferably, the control device executes the communication of information between the mechanical energy storage device, in particular one or more energy storage means, with other components of the manipulator configuration. Preferably, the control device features a bus interface for this purpose. Preferably, the control device is configured to be able to execute safety functions of the mechanical energy storage device and/or the energy storage means, in particular for triggering a stop and/or to activate a brake. Advantageously, the mechanical energy storage device can, as a result, readily be retrofitted and/or expanded, or integrated, in different manipulator configurations.

In a preferred embodiment, the control device of the manipulator configuration is configured for controlling the mechanical energy storage device, in particular for controlling its energy storage means. The control device assumes the registration of components as well as the control of the active components of the mechanical energy storage device, in particular a converter, the electric motor, and/or a brake. Preferably, the control device is configured for executing a regulation of the electric motor, preferably the range of the rate of rotation, in particular for adjusting a rotational rate and/or a voltage thereof. Moreover, the control device preferably assumes the control of the communication of information via the mechanical energy storage device with other components of the manipulator configuration, in particular, the control device features a bus interface for this purpose. In particular, the control is also preferably configured for executing safety functions of the mechanical energy storage device and/or its energy storage means, in particular for triggering a stop and/or activating a brake.

Preferably one or more energy storage means of the mechanical energy storage device are registered and/or controlled as one or more (other) axes of the manipulator configuration. An axis as set forth in the present invention is, in particular, a controllable drive unit of a manipulator, which is preferably configured to drive a manipulator joint. As a result, the computing capacities and/or control functions and structures already present in the manipulator configuration are advantageously used, in particular, for readily integrating the mechanical energy storage device and/or one or more energy storage means. In other words, the energy storage device can be treated as a drive axis, or as numerous drive axes of the manipulator configuration, regulating, for example, rotational rates, torques, and/or current, etc.

Preferably, the control device of the manipulator configuration communicates with a control device of the mechanical energy storage device. Advantageously, specific functions, which are, for example, needed only for the mechanical energy storage device, can be implemented, as a result, by means of the local control device. Local control functions of this type can represent, in particular, the controlling of one or more converters and/or one of the electric motors of one or more energy storage means of the mechanical energy storage device. Moreover, functions of this type can concern the control of the brakes. Preferably a local control function concerns a distributed control of numerous energy storage means, for the purpose of storing energy and/or making said energy available.

A method according to the invention serves for the operation of a manipulator configuration for the storage, in particular the temporary storage, of preferably alternating power for the manipulator configuration, in particular braking power, in a mechanical energy storage device. Preferably, the method enables the storage of energy for one or more manipulators. Preferably, the energy for the manipulator in question is stored in one or more energy storage means of the energy storage device. Energy is stored for one or more manipulators in numerous energy storage means, in particular, by means of a static dedication. Advantageously, the energy of one or more manipulators is dynamically supplied to different energy storage means of the mechanical energy storage device, and in this manner, optimal energy storage, corresponding to predetermined performance functions or quality functions, is obtained. In a manner optimized in terms of energy use, an optimal supplying of energy can be implemented.

In accordance with a preferred embodiment, one or more manipulators are supplied with energy from the mechanical energy storage device, in particular, are moved therewith. The supplying of energy occurs thereby, preferably by means of a static dedication of one or more energy storage means of the mechanical energy storage device to the manipulator drives of one or more manipulators. Advantageously, the supplying of energy from one or more energy storage means of the mechanical energy storage device to the manipulator drives of one or more manipulators occurs according to a dynamic dedication.

In a preferred embodiment of the method, energy is stored and/or supplied by the mechanical energy storage device depending on the load and/or the state thereof. Storage and/or supplying of this type can be implemented, in particular, by means of a dynamic dedication of one or more energy storage means. Preferably, a load and/or state dependent storage and/or supplying of energy occurs by means of a dynamic dedication of one or more energy storage means of the mechanical energy storage device to one or more manipulator drives of one or more manipulators of the manipulator configuration.

BRIEF DESCRIPTION OF THE DRAWINGS

Other advantages, properties and application possibilities of the present invention can be derived from the following description in connection with the drawings. They show, in part schematically.

DETAILED DESCRIPTION

Figure 1:
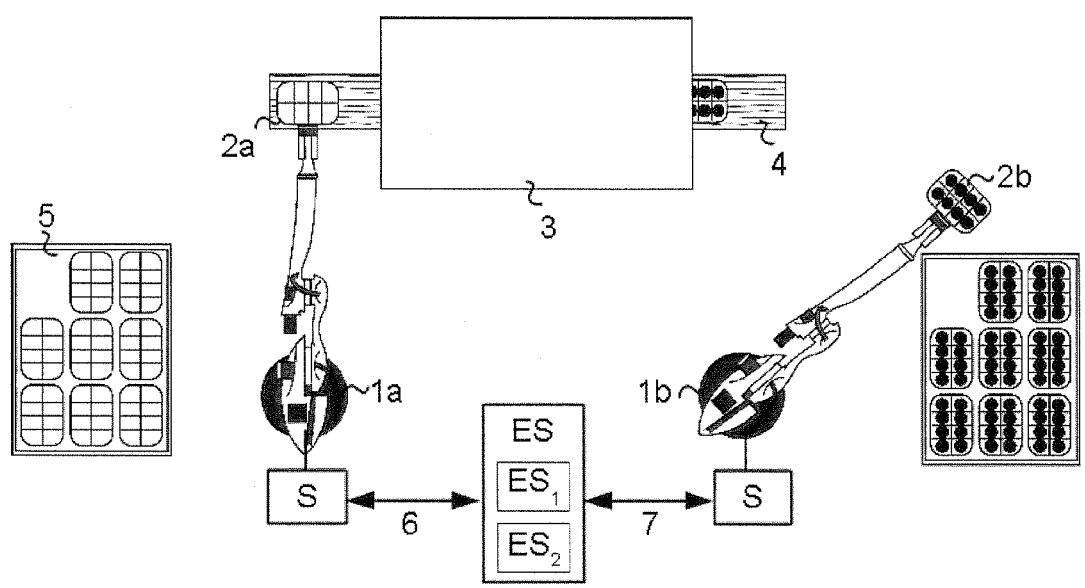
FIG. 1: A manipulator configuration according to one embodiment of the present invention.

FIG. 1 shows a manipulator configuration according to one embodiment of the present invention. In a commission application, empty boxes 2a are filled with bottles by means of a filling apparatus 3. For this, the empty boxes are placed on a conveyor belt 4 by a robot 1a, pass through filling apparatus 3 and commissioned on the other side of the filling apparatus to a target pallet 5 by a second robot 1b. The filling apparatus functions at a high speed, such that the empty boxes 2a and the filled boxes 2b must be placed in a quick sequence on the conveyor belt, and also again removed from the conveyor belt after being filled. The two robots 1a, 1b execute thereby highly alternating movements between the pallets and the conveyor belt. The control devices S of both robots are connected to a mechanical energy storage device ES, having two energy storage means $ES_1$ and $ES_2$. The energy storage means are configured to be transportable, such that the filling apparatus can be constructed in a flexible manner. The mechanical energy storage device ES and the control devices S of the robots 1a, 1b are connected to one another by means of a power bus. For this, the power bus can be subdivided into two power bus sections 6, 7 via two power bus interfaces. Preferably, the mechanical energy storage device and/or the energy storage means can feature a housing, which preferably protects the mechanical energy storage device from environmental influences in a commissioning mode, in particular liquids and soiling. Advantageously, the housing protects the vicinity of the mechanical energy storage device, in particular the machines and operators, from a malfunction of the mechanical energy storage device. In particular for the purpose of preventing hazards resulting from parts of the mechanical energy storage device being thrown off, the housing can be feature a protective cage, which encases the mechanical energy storage device, and/or two protective cages, wherein, in each case a protective cage encases each of the two energy storage means.

By connecting the two robots 1a, 1b by means of a power bus to the energy storage device ES, the energy from the decelerating robot drives of one robot 1a, 1b can be used directly for accelerating the robot drives of the other robot 1a, 1b. As a result, energy losses are prevented on the one hand, and the average quantity of energy to be stored by the energy storage device ES can be maintained at the lowest possible level, on the other hand, such that the energy storage device can be dimensioned to be optimized in terms of power. Advantageously, additional costs for unnecessarily supplied storage capacity can be eliminated.

With a suitable dimensioning of the dynamics and the capacity of the mechanical energy storage device, it is ensured by this architecture that at any point in time, the largest possible amount of excess energy can be stored, or the largest possible amount of regenerative energy can be reused by all robots requiring power. Preferably, a dynamic dedication of the energy storage means is configured. This can be particularly advantageous if electrical energy $E^{el}_M$ generated by the braking phase is to be obtained without losses.

Figure 2:
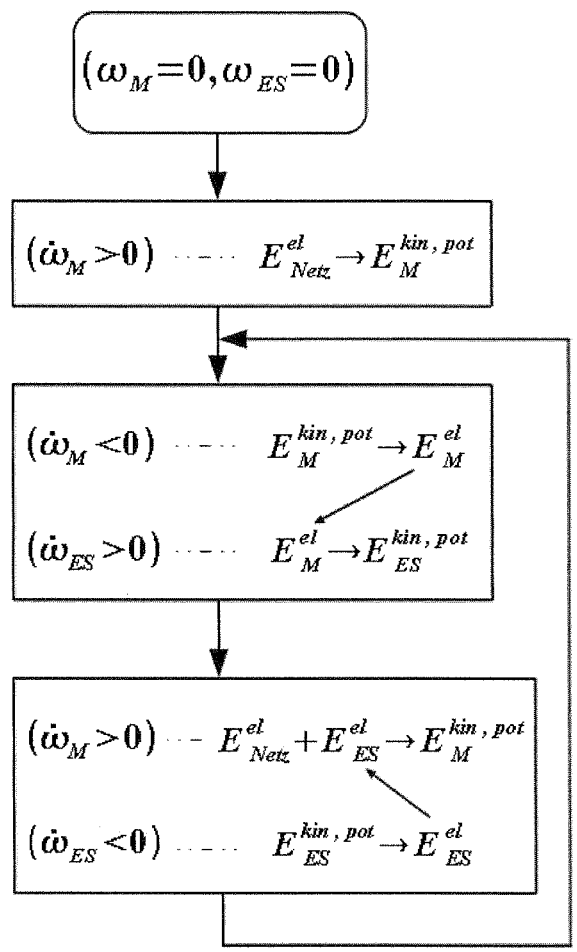
FIG. 2: A method for operating the manipulator configuration according to one embodiment of the present invention.

FIG. 2 shows a method according to one embodiment for operating a manipulator configuration having one manipulator and one mechanical energy storage device having one energy storage means. At the start, the manipulator is motionless $\omega_M=0$ and the charge state of the mechanical energy storage device is zero, $\omega_{ES}=0$. In a first step, the manipulator is first accelerated with power from an external energy source $E^{el}_{Netz}$, preferably a battery and/or from a power supply network, and a mechanical energy is built up $E^{kin,pot}_M$. In a second step, the manipulator is braked in a generator mode, such that mechanical energy $E^{kin,pot}_M$ is converted to electrical energy $E^{el}_M$. In this phase, said energy is stored by a mechanical energy storage device, in that it builds up this mechanical energy $E^{kin,pot}_{ES}$. In a third phase, the manipulator again accelerates, and uses energy for this from the mechanical energy storage device $E^{el}_{ES}$, which brakes thereby in a generator mode. The difference between the needed energy $E^{kin,pot}_M$ and the energy $E^{el}_{ES}$ supplied by the mechanical energy storage device is compensated for by the energy $E^{el}_{Netz}$ from the external power source. The steps two and three can be repeated, in particular until the manipulator is again motionless, and the charged state of the mechanical energy storage device is again zero.

LIST OF REFERENCE SYMBOLS 1a robot
1b robot
2a empty box
2b filled box
3 filling apparatus
4 conveyor belt
5 pallet
6, 7 power bus
S control device
ES mechanical energy storage device
$ES_1$ first energy storage means
$ES_2$ second energy storage means
$\omega_{ES}$ velocity of the mechanical energy storage device
$\dot\omega_{ES}$ acceleration of the mechanical energy storage device $\dot{\omega}_M$ velocity of the manipulator drive
$\ddot{\omega}_M$ acceleration of the manipulator drive
$E_{Netz}^{el}$ electrical energy supplied by the external power source
$E_{ES}^{el}$ electrical energy supplied by the mechanical energy storage device
$E_{ES}^{kin,pot}$ mechanical energy built up by the mechanical energy storage device
$E_M^{el}$ electrical energy generated by the manipulator
$E_M^{kin,pot}$ electrical energy built up by the manipulator

What is claimed is:

1. A manipulator configuration comprising:
   at least one robotic manipulator including at least one drive configured to drive a manipulator joint;
   at least one control device controlling operation of the robotic manipulator; and
   at least one mechanical energy storage device, which is configured to store mechanical energy from the deceleration of the drive of the at least one robotic manipulator;
   wherein the control device controls the at least one mechanical energy storage device; and
   an electric motor coupled with the mechanical energy storage device for converting electrical energy to mechanical energy or mechanical energy to electrical energy;
   wherein electrical energy generated during deceleration of a drive is converted to mechanical energy by the electric motor.

2. The manipulator configuration according to claim 1, wherein the mechanical energy storage device is configured for storing at least one of kinetic energy or potential energy.

3. The manipulator configuration of claim 2, wherein the mechanical energy storage device is configured for storing kinetic energy using a rotating mass.

4. The manipulator configuration according to claim 1, wherein the mechanical energy storage device is connected to at least one manipulator drive of the manipulator configuration.

5. The manipulator configuration of claim 4, wherein the mechanical energy storage device is connected to at least one manipulator drive by an intermediate circuit.

6. The manipulator configuration according to claim 1, further comprising a second energy storage device configured for storing at least one of electric, electrochemical, or electrophysical energy.

7. The manipulator configuration according to claim 1, further comprising a second energy storage device configured for the permanent storage of energy, without loss.

8. The manipulator configuration according to claim 1, wherein the mechanical energy storage device is configured to be operated in a predetermined rotational rate range.

9. The manipulator configuration of claim 8, wherein the mechanical energy storage device is configured to be operated with a predetermined rotational rate.

10. The manipulator configuration according to claim 1, wherein the mechanical energy storage device is connected to the manipulator configuration such that it is at least one of detachable, moveable, or configured to be carried.

11. The manipulator configuration according to claim 1, wherein the at least one mechanical energy storage device includes at least two energy storage means that are decoupled from one another.

12. The manipulator configuration according to claim 1, wherein the at least one mechanical energy storage device is formed from the at least one manipulator.

13. A method for operating a manipulator configuration including a robotic manipulator having at least one drive configured to drive a manipulator joint, a controller that controls the robotic manipulator, and a mechanical energy storage device, the method comprising:
   storing mechanical energy of the manipulator configuration in the mechanical energy storage device; and
   controlling the mechanical energy storage device with the controller to supply the robotic manipulator with energy from the mechanical energy storage device;
   wherein the mechanical energy is obtained from the deceleration of a drive of the robotic manipulator; and
   wherein an electric motor coupled with the mechanical energy storage device converts the mechanical energy generated during deceleration of the drive to mechanical energy.

14. The method according to claim 13, further comprising at least one of storing or supplying via the mechanical energy storage device load and/or state dependent energy.

* * * * *